US006192587B1

United States Patent
Thompson

(10) Patent No.: US 6,192,587 B1
(45) Date of Patent: Feb. 27, 2001

(54) AUTO-ALIGNING RIBBON SPLITTER

(75) Inventor: Justin Thompson, Huntersville, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/452,128

(22) Filed: Dec. 1, 1999

(51) Int. Cl.[7] .............................. B21F 13/00; B26B 27/00
(52) U.S. Cl. ............................... 30/90.1; 30/233; 30/293; 81/9.4; 385/137
(58) Field of Search .................................... 30/90.1, 90.4, 30/90.8, 194, 233, 289, 293; 81/9.4, 9.41, 9.44, 9.51; 385/134, 137

(56) References Cited

U.S. PATENT DOCUMENTS

| | | | |
|---|---|---|---|
| 2,521,688 | * 9/1950 | Cataldo et al. | 30/90.1 |
| 4,133,109 | * 1/1979 | Dow | 30/90.4 |
| 5,140,751 | 8/1992 | Faust | 30/90.4 |
| 5,295,421 | 3/1994 | Mansfield | 81/9.4 |
| 5,416,882 | 5/1995 | Hakoun et al. | 385/137 |
| 5,416,883 | 5/1995 | Hakoun et al. | 385/137 |
| 5,481,638 | * 1/1996 | Roll et al. | 385/134 |
| 5,681,417 | * 10/1997 | Jacobs | 30/90.1 |
| 5,809,195 | 9/1998 | Brown et al. | 385/114 |
| 5,893,302 | 4/1999 | Strom | 81/9.51 |
| 5,926,598 | 7/1999 | Klein | 385/137 |

OTHER PUBLICATIONS

No. 019579 Abstract of French Patent, Gerard.
No. 019580 Abstract of French Patent, Gerard.

* cited by examiner

Primary Examiner—Hwei-Siu Payer
(74) Attorney, Agent, or Firm—Sughrue, Mion, Zinn, Macpeak & Seas, PLLC

(57) ABSTRACT

An auto-aligning ribbon splitter which can be used on any size optical fiber ribbon made by any manufacturer. The auto-aligning ribbon splitter centers an optical fiber ribbon over a first splitting edge so that it can be split into two sub-units each having an equal number of optical fibers therein. The auto-aligning ribbon splitter includes a bottom plate having a channel. The channel includes a first splitting edge. Two movable plates are disposed on the bottom plate so that they are parallel to, and are centered about, the first splitting edge. A mechanism, such as an adjustment rod, is connected to the movable plates to change their position relative to the first splitting edge, but maintain each plate at an equal distance from the first splitting edge. A second splitting edge, on a top body, may then be pressed against the centered ribbon to cause an initial split between two sub-units, as the top body pushes half of the ribbon into the channel on the bottom plate. The ribbon is thus easily and safely split, and this split can be extended to any length by hand.

13 Claims, 9 Drawing Sheets

AUTO-ALIGNING RIBBON SPLITTER

BACKGROUND

The present invention is directed to an auto-aligning ribbon splitter tool for gaining midspan access to an optical fiber ribbon. More particularly, the auto-aligning ribbon splitter divides any size optical fiber ribbon into two sub-unit ribbons containing an equal number of optical fibers.

For service and maintenance purposes, it often becomes necessary to perform splicing and termination operations on individual sub-units of an optical fiber ribbon. Further, it is desirable to perform such operations on only the particular sub-unit within the optical fiber ribbon without disturbing or damaging other sub-units within the ribbon.

Without the tool of the present invention, midspan separation is difficult at best, and poses a high threat to the optical fibers within the ribbon. The threat is particularly acute when the optical fibers are live, as is usually the case in a midspan access situation. Access to fibers at a midspan location is, therefore, typically limited to a peel procedure which exposes all of the individual fibers within the splittable ribbon, i.e., both sub-units have their protective sheath stripped off. If access is desired in only one of the ribbon sub-units at this midspan location, then the remaining exposed fibers are placed at unnecessary risk by having the protective sheath of their ribbon sub-unit removed.

Siecor sells a tool for splitting optical fiber ribbons into sub-unit ribbons. The Siecor tool is similar in nature to that described by U.S. Pat. No. 5,926,598. However, the Siecor tool is designed to work on preset ribbon dimensions. That is, the Siecor tool can:

- split a Siecor optical fiber ribbon having 24 fibers into two sub-units of 12 fibers each;
- split a Siecor optical fiber ribbon having 12 fibers into two sub-units of 6 fibers each, into two sub-units wherein one sub-unit has 4 fibers and the other 8 fibers, or two sub-units wherein one sub-unit has 2 fibers and the other has 10 fibers;
- split a Siecor optical fiber ribbon having 8 fibers into two sub-units of 4 fibers each, or into two sub-units wherein one sub-unit has 2 fibers and the other has 6 fibers;
- split a Siecor optical fiber ribbon having 6 fibers into two sub-units wherein one sub-unit has 2 fibers and the other has 4 fibers;
- and can split a Siecor optical fiber ribbon having 4 fibers into two sub-units having 2 fibers each.

But the Siecor tool will not work for any other ribbon/sub-unit arrangement. Specifically, the Siecor tool cannot split an optical fiber ribbon having 6 fibers into two sub-units each having three fibers. That is, the Siecor tool cannot split a 6-fiber ribbon in half. Further, the Siecor tool is designed for Siecor's optical fiber ribbons, and is not universally applicable to any ribbon size made by any manufacturer. That is, the Siecor tool will not work on any other manufacturer's ribbon unless their ribbon is dimensionally identical to the Siecor design.

Accordingly, it is an object of the present invention to overcome the disadvantages of the prior art. Specifically, it is an object of the present invention to automatically center any size ribbon, made by any manufacturer, to be split into two sub-units each having an equal number of optical fibers therein.

SUMMARY OF THE INVENTION

The auto-aligning ribbon splitter is designed for use with optical fiber ribbons and, in particular, splittable ribbons. This tool fits any splittable ribbon size by incorporating movable plates that center the ribbon over a first splitting edge. After the ribbon is inserted in the tool, the movable plates are adjusted to center the ribbon, and then a top body having a second splitting edge is pressed down onto the ribbon. The first and second splitting edges act to separate the optical fiber ribbon into two sub-unit ribbons. The tool provides an initial split which may then be separated to any desired length of the sub-units by hand. Thus, a user may gain access to one sub-unit while leaving the other sub-unit within its protective sheath. The tool of the present invention therefore allows a safe and easy midspan separation of the sub-units contained within a splittable optical fiber ribbon of any size, made by any manufacturer.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein.

DETAILED DESCRIPTION OF THE INVENTION

The auto-aligning ribbon splitter of the present invention is usable with any size optical fiber ribbon, and can be adjusted so that the ribbon is automatically centered to be split in half thereby producing two sub-unit ribbons. The auto-aligning ribbon splitter of the present invention will now be described in detail with reference to FIGS. 1–5.

Figure 1:
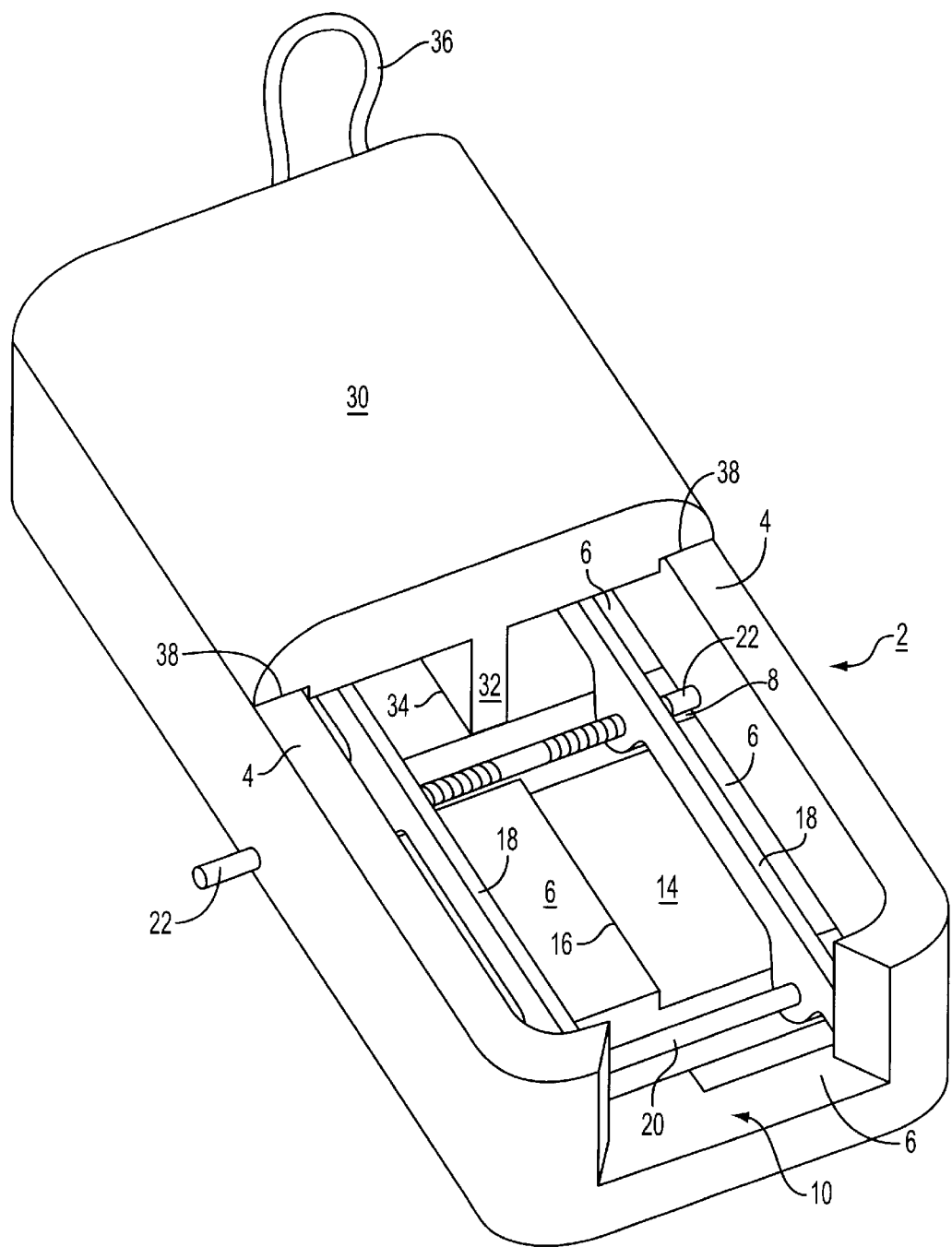
FIG. 1 is a top plan view of the ribbon splitter.
Figure 2:
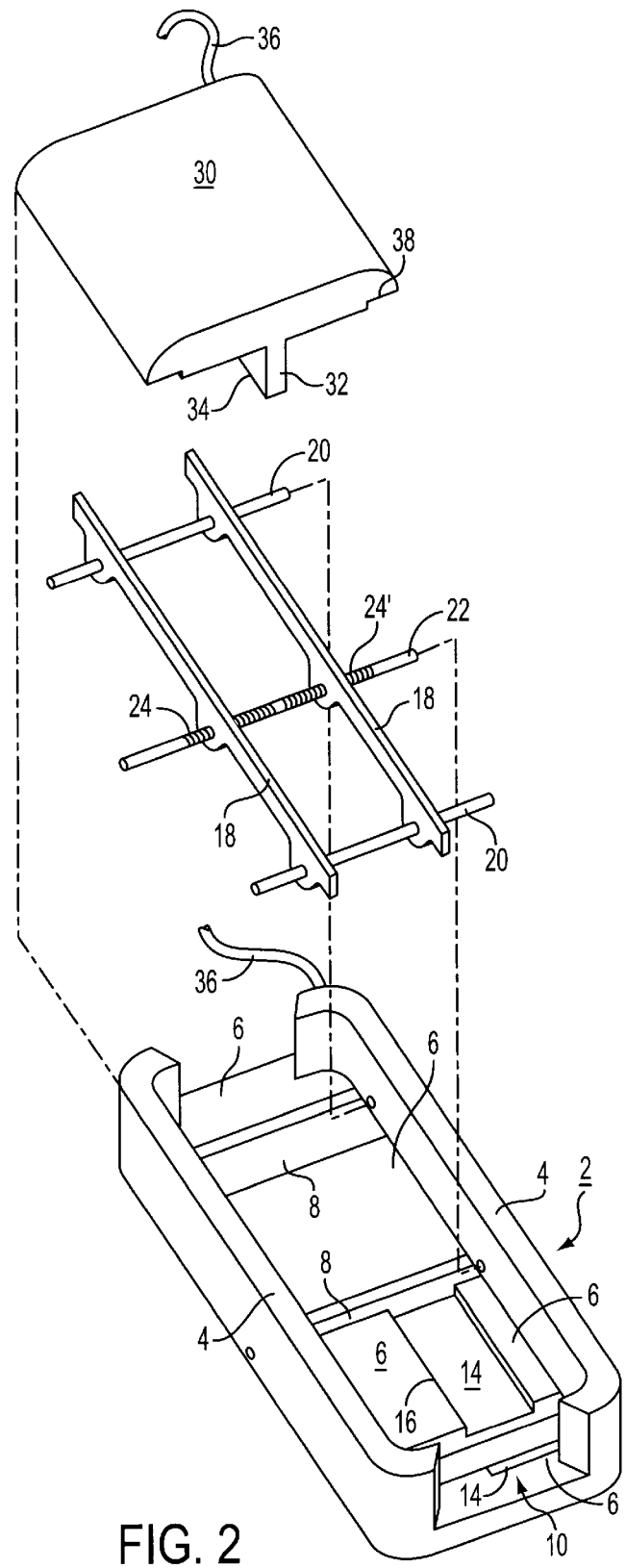
FIG. 2 is an exploded plan view of the ribbon splitter as shown in FIG. 1.
Figure 3:
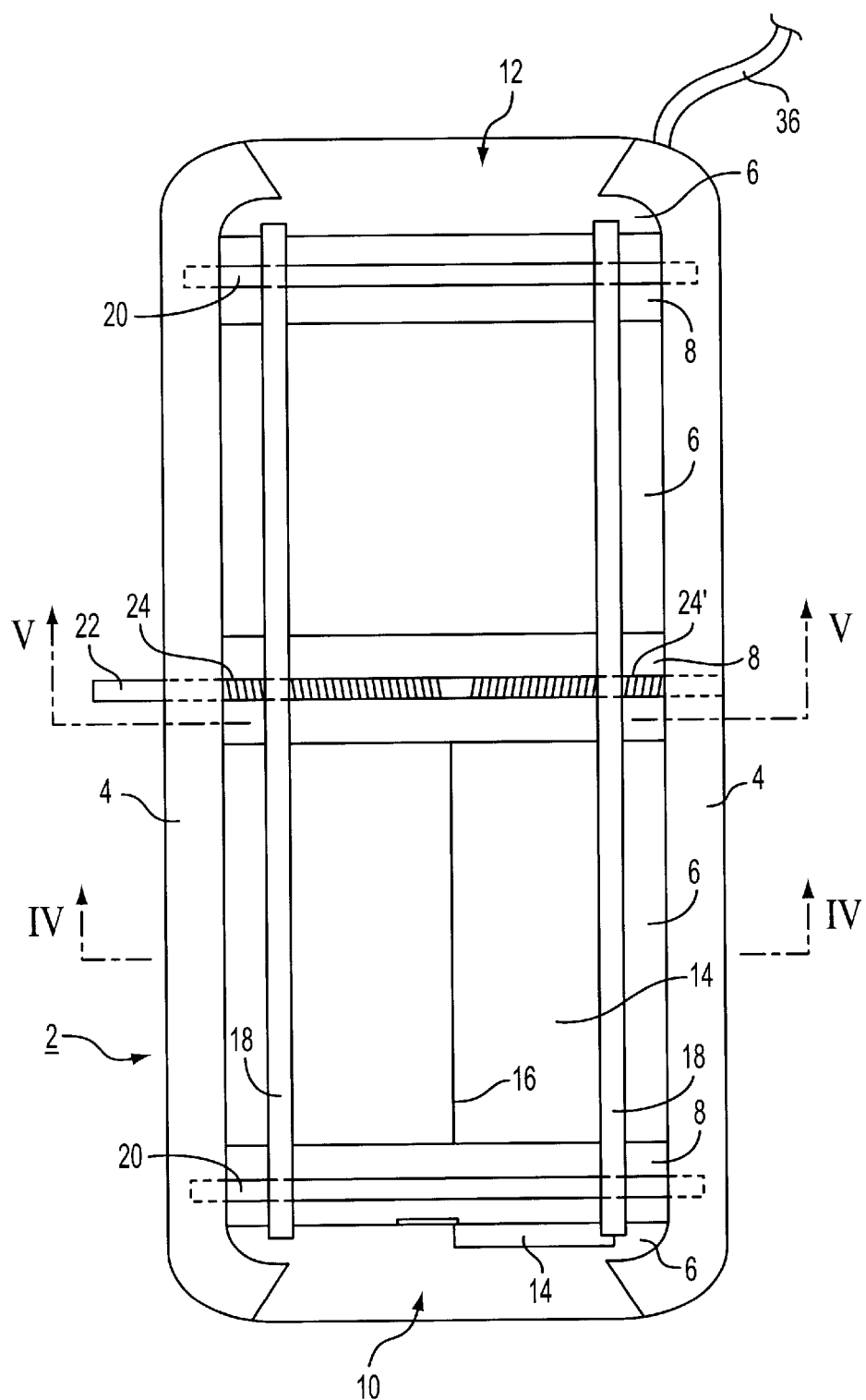
FIG. 3 is a top view of the ribbon splitter, but is shown without the top body, for clarity.

The auto-aligning ribbon splitter includes two main parts: a main body 2; and a top body 30. The top body 30 is attached to the main body 2 by a flexible tether 36. In FIG. 3, the flexible tether 36 is only partially shown because in that Figure the top body 30 is not included. The flexible tether 36 keeps the two main parts of the auto-aligning ribbon splitter together for convenient use, but allows the top body 30 to be separated from the main body 2 so that the midspan of an optical fiber ribbon may be inserted therebetween. That is, the tether 36 attaches the main body 2 to the top body 30 to prevent one part from being lost either in the field or in a technician's tool box. Alternatively, the main body 2 and the top body 30 may be held together by a hinge, pin, or any other suitable connection as long as these parts may be separated enough to allow the midspan of an optical fiber ribbon to be inserted therebetween.

The main body 2 has side walls 4 which extend from a bottom plate 6. The side walls 4 and bottom plate 6 may be made of any suitable material as, for example, metal, aluminum, plastic, and hard plastic.

The side walls 4 define a front opening 10 and a rear opening 12 which guide the entrance of an optical fiber ribbon into the auto-aligning ribbon splitter tool. The side walls 4 also assist in preventing a ribbon from being crushed after it has been split, as described later.

The bottom plate 6 includes a channel 14 which is recessed from the top portion of the bottom plate so as to accommodate half of an optical fiber ribbon therein. The channel 14 may be of any suitable width, for example slightly larger than twelve-fiber width so as to allow the tool to split up to a twenty-four-fiber ribbon. The channel 14 includes a first splitting edge 16 which is used to split an optical fiber ribbon in half, as described later. A pair of movable plates 18 is disposed on top of the bottom plate 6. The movable plates 18 are parallel to, and spaced equidistantly from, the first splitting edge 16 so that they function to position the optical fiber ribbon in the lateral direction.

Figure 4:
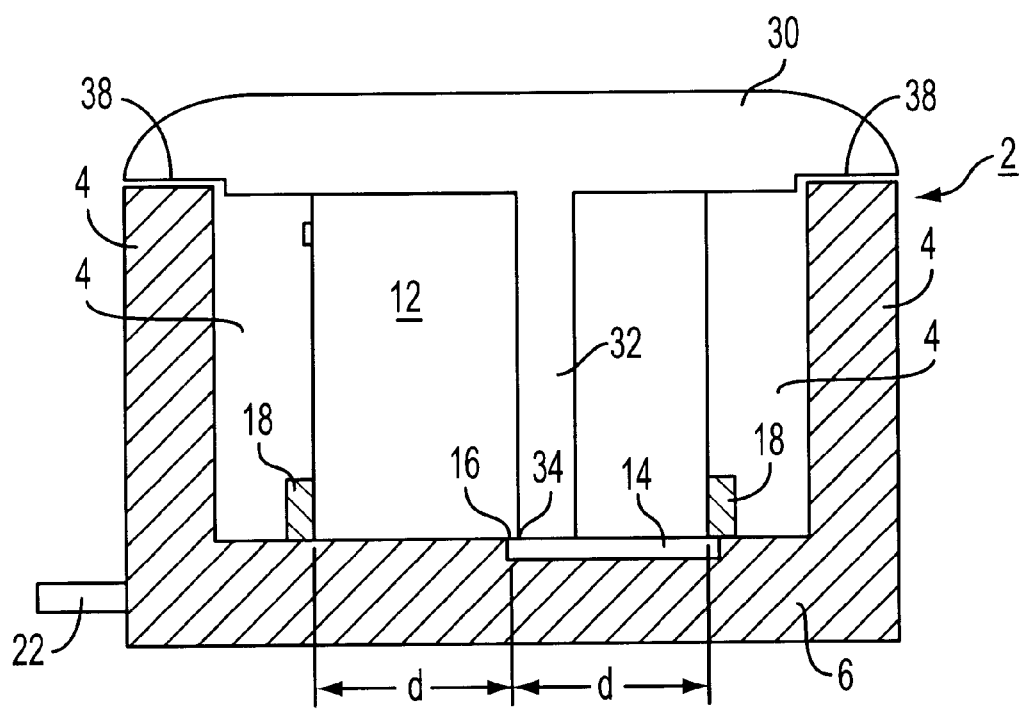
FIG. 4 is a cross sectional view of the ribbon splitter as taken across line IV—IV in FIG. 3, but with the top body reinserted as shown in FIG. 1.
Figure 5:
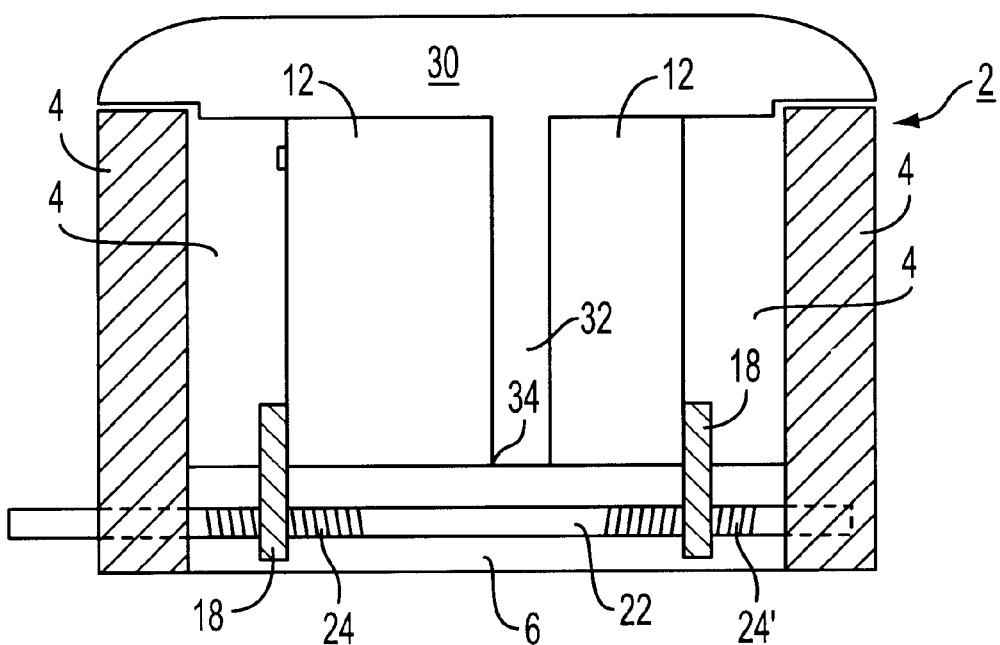
FIG. 5 is a cross sectional view of the ribbon splitter as taken across line V—V in FIG. 3, but with the top body reinserted as shown in FIG. 1.

As shown in FIG. 4, each movable plate 18 is spaced at a distance d, for example, from the first splitting edge 16. The distance d may be any suitable distance, is adjustable, and is at its maximum as shown in FIG. 4. The maximum distance d may be slightly larger than a twenty-four-fiber ribbon, for example. The movable plates 18 are connected with the side walls 4 of the main body 2 by support rods 20, respectively located at the front and rear of the main body 2, and by adjustment rod 22 (also called an adjustment mechanism) which is located between the support rods 20.

The support rods 20 and adjustment rod 22 are arranged in parallel to each other and are disposed in rod openings 8 within the bottom plate 6. The support rods 20 extend into the side walls 4, and through the movable plates 18 so that the latter may slide smoothly thereon. The support rods 20 maintain the movable plates 18 parallel to one another.

The adjustment rod 22 extends through the movable plates 18 and, additionally, extends through one of the side walls 4 so that it can be easily rotated by a user. The adjustment rod 22 includes two opposite-handed screw threads 24, 24' which mate with corresponding screw threads on the movable plates 18. For example, the screw threads 24 on one side may be right-handed, whereas the screw threads 24' on the other side are left-handed, or vise versa. The screw threads 24, 24' are opposite-handed so that when the adjustment rod 22 is rotated in one direction, the movable plates 18 move toward one another. Also, when the adjustment rod 22 is rotated in the opposite direction, the movable plates 18 move away from one another. The adjustment rod 22 may contain indicia which inform the user which way the movable plates 18 will move upon a particular rotation of the adjustment rod 22. Further, the screw threads 24, 24' have the same pitch so that the movable plates 18 are maintained at an equal distance from the first splitting edge 16. This is an important feature which allows the auto-alignment of a ribbon which is to be split. That is, because the movable plates 18 are always maintained equidistant from the first splitting edge, any ribbon placed within the tool will automatically be centrally positioned to be split in half.

For example, assume a user desires to split a twenty-four fiber ribbon in half. The user turns the adjustment rod 22 so as to space each of the movable plates 18 at a distance d, of slightly larger than twelve fiber width, from the first splitting edge. The user then inserts the optical fiber ribbon into the tool so that it sets on the bottom plate 6 between the two movable plates 18. The user then turns the adjustment rod 22 so as to move the plates 18 toward one another—making the distance d smaller—until each plate is aligned with, and just touches, one side of the ribbon. Because of the manner in which the adjustment rod 22, movable plates 18, channel 14, and first splitting edge 16 are arranged, the ribbon is then automatically centered on the first splitting edge 16. That is, twelve fibers are on one side of the first splitting edge 16, whereas the remaining twelve fibers are on the other side of the first splitting edge 16. A similar result is achieved with any other fiber count ribbon made by any manufacturer.

Alternatively, any other adjustment mechanism, including any other connection between the adjustment rod 22 and the movable plates 18, may be used as long as the plates 18 are kept at an equal distance from the first splitting edge 16 over their entire range of movement. For example, a rack and pinion arrangement may be used as an adjustment mechanism.

After centering the ribbon on the first splitting edge 16, the user then manipulates the top body 30 to split the optical fiber ribbon. Referring to FIG. 4, the top body 30 includes a downward protrusion 32 having a second splitting edge 34. The second splitting edge 34 is aligned with the first splitting edge 16 when the top body 30 is inserted into the main body 2 over the channel 14. The top body further includes stop surfaces 38 to properly position the top body 30 with respect to the main body 2 during a ribbon splitting operation. That is, the stop surfaces 38 of the top body 30 abut the side walls 4 when the top body 30 is placed over the channel 14 in the bottom plate 6. The side walls 4 abut the stop surfaces 38 so that the second splitting edge 34 is slightly lower than the first splitting edge 16 so as to split the ribbon, but also so that the downward protrusion 32 is spaced from the bottom of the channel 14 and does not crush an optical fiber ribbon which has just been split.

Alternatively, instead of using the top body 3, a user may use any other suitable tool or block to depress the ribbon against the first splitting edge 16 to thereby split the ribbon. For example, a flat end of a screw driver, an end of a pencil, or any other suitable surface may be used to depress the ribbon onto the first splitting edge 16. However, it is preferred to use the top body 30 because it is dimensioned so that it will not move the plates 18 as it presses the ribbon onto the first splitting edge 16 to split the ribbon, and using any other object in place of this top body 30 may cause undesirable damage to the fibers contained within the ribbon. Further, the top body 30 includes second splitting edge 34 and, therefore, more accurately and easily splits the optical fiber ribbon.

The auto-aligning ribbon splitter of the present invention is not manufacturer specific, and will work to split any optical fiber ribbon into two parts having equal fibers in each part. Further, the auto-aligning ribbon splitter can be dimensioned wide enough so as to accommodate any size optical fiber ribbon, for example a twenty-four fiber ribbon.

Figure 6:
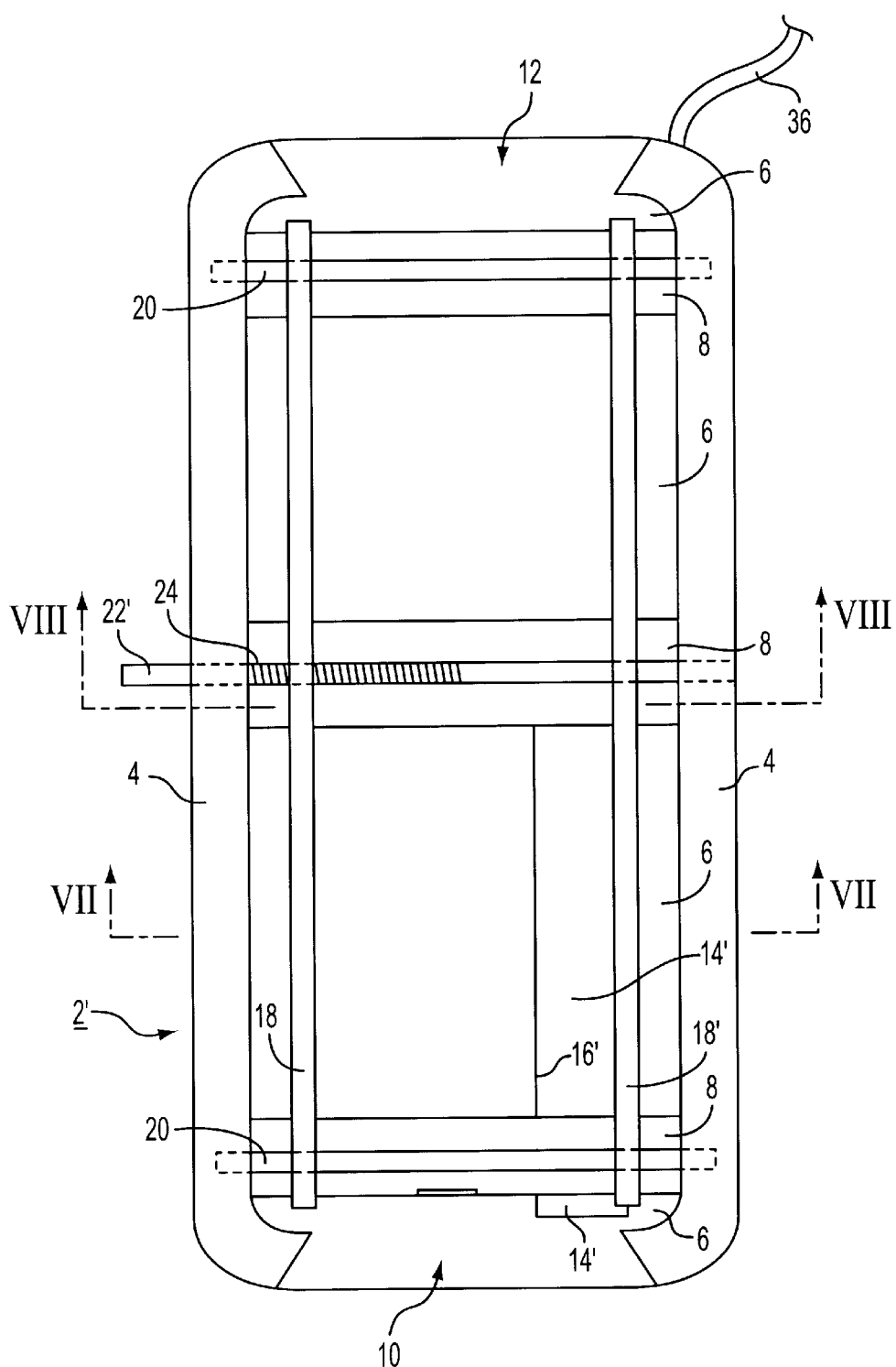
FIG. 6 is a top view of a modified embodiment of the ribbon splitter, but is shown without the top body, for clarity.
Figure 7:
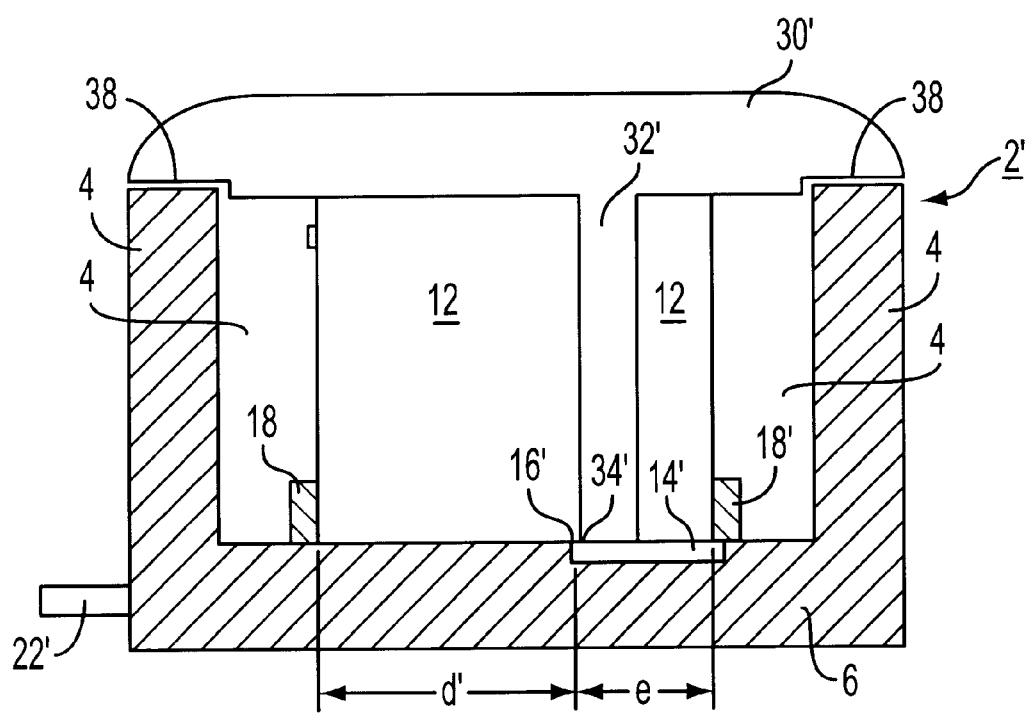
FIG. 7 is a cross sectional view of the ribbon splitter as taken across line VII—VII in FIG. 6, but with the top body reinserted.
Figure 8:
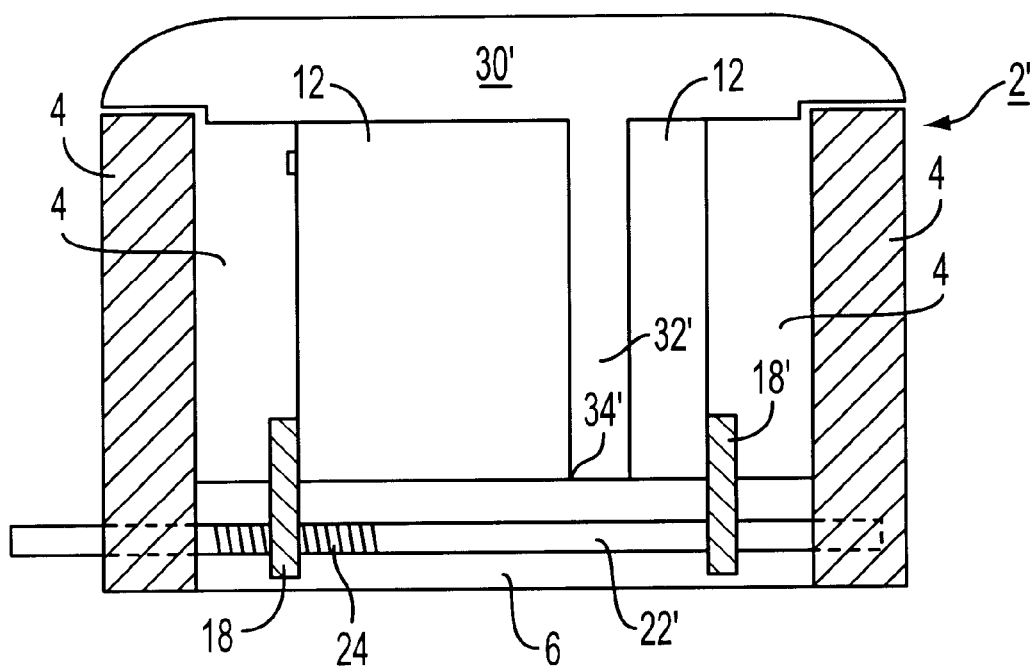
FIG. 8 is a cross sectional view of the ribbon splitter as taken across line VIII—VIII in FIG. 6, but with the top body reinserted.

A modified embodiment of the present invention is shown in FIGS. 6–8, wherein the same reference numerals designate parts which are the same as in the previous embodiment, and wherein similar but modified parts have been designated with a prime.

The modified embodiment includes two main parts: a main body 2'; and a top body 30'. The top body 30' is attached to the main body 2' by a flexible tether 36, for example, as in the previous embodiment. The downward projection 32' and the second splitting edge 34' vary from similar elements of the previous embodiment in their position across the width of the tool only; they do not vary in function.

The main body 2' has side walls 4 which extend from a bottom plate 6. The bottom plate 6 includes a channel 14' which is recessed from the top portion of the bottom plate so as to accommodate a portion of an optical fiber ribbon therein. The channel 14' is similar to the channel 14, and only varies therefrom in width. The channel 14' includes a first splitting edge 16' which is used to split an optical fiber.

This modified embodiment includes an offset between the ribbon centerline and the splitting edge 16'. More specifically, a fixed plate 18' is fixed relative to the splitting edge 16', and is set at a fixed distance e therefrom. See FIG. 7. The fixed plate 18' may be fixedly attached to the bottom plate 6, the support rods 20, or both.

This arrangement allows for the separation of a predetermined quantity of fibers from the ribbon—the quantity determined by the distance e. The distance e is set based on the desired number of fibers to be split from the ribbon. For example, the distance e can be a three-fiber width. Additionally, the plate 18' is fixed relative to the splitting edge 16' to facilitate the separation of a certain quantity of fibers, regardless of the ribbon's complete fiber count. The movable plate 18 is then moved relative to the splitting edge 16' by adjustment rod 22', and threads 24, as in the previous embodiment, thereby adjusting the distance d' to accommodate different ribbon widths.

For example, to split three fibers off of a twelve-fiber ribbon, the tool is designed to have a distance e of three fibers, and then the movable plate 18 is moved by adjustment rod 22' so that the distance d' is slightly larger than nine fibers. The optical fiber ribbon is placed between movable plate 18 and fixed plate 18'. The movable plate 18 is then moved toward the optical fiber ribbon so that each plate is aligned with, and just touches, one side of the ribbon. Because the ribbon is held on both sides, it is automatically aligned parallel to the splitting edge, and is held in a stable manner. In this embodiment, and this example, nine fibers are on one side of the splitting edge 16', whereas three fibers are on the other side. Thus, a twelve-fiber ribbon can be split into two sub-units wherein one sub-unit has nine fibers, and the other sub-unit has three fibers. Alternatively, with the distance e being a three-fiber width, for example, the modified embodiment could split a twenty-four-fiber ribbon into two sub-units wherein one sub-unit includes twenty-one fibers, and the second sub-unit includes three fibers. Similarly, in this example, the modified embodiment would be able to split a six fiber ribbon in half because the distance e is fixed at a three-fiber width.

By adjusting the distance e during manufacture, and by adjusting the distance d' during use, the auto-aligning ribbon splitter of the modified embodiment can split any number of fibers off of any size ribbon. The disadvantage of the modified embodiment is that it is no longer universally applicable because the distance e would be determined as a function of the diameter of the optical fibers contained within the ribbon—including glass core/cladding, primary coating, secondary coating and potentially the ink coating as well. Fibers from one manufacturer to the next may have slightly different diameters and, therefore, require slightly different magnitudes for the distance e, even when the same number of fibers is to be split from a ribbon. In the primary embodiment of the invention, by contrast, the offset is zero, is therefore not dependent on fiber diameter, and the tool is thus universally applicable to all optical fiber ribbons.

Figure 9A:
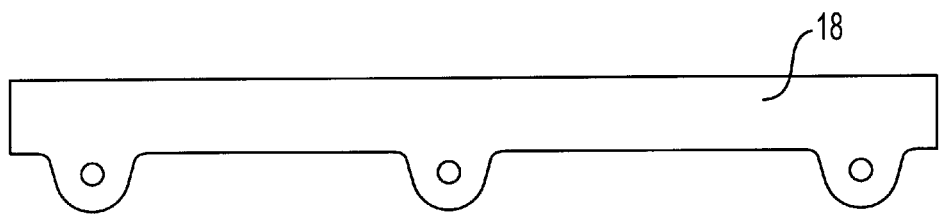
FIG. 9A is a side view of a positioning plate according to a first embodiment of the present invention.
Figure 9B:
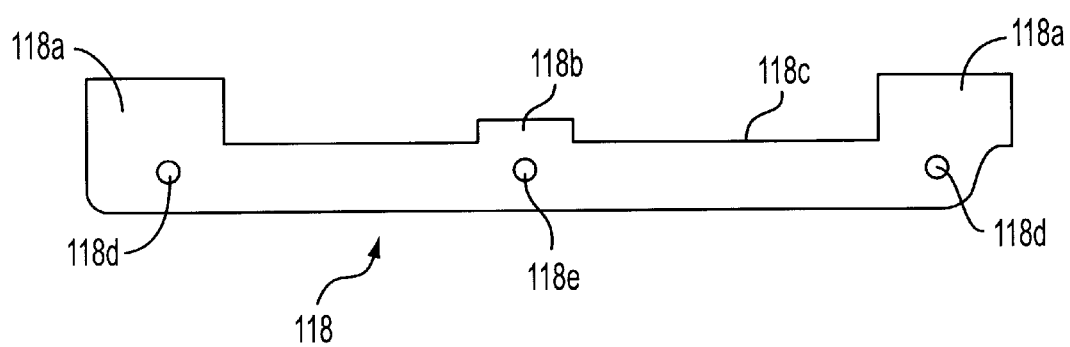
FIG. 9B is a side view of a modified positioning plate according to the present invention.

FIGS. 9A and B show a comparison between two types of positioning plate which can be used in the present invention. FIG. 9A is a side view of a movable plate 18. The fixed plate 18' has a similar shape and, therefore is not shown separately. The movable plate 18 includes a bottom surface which slides along the top surface of the bottom plate 6. Alternatively, as shown in FIG. 9B, a modified plate 118 includes a top surface 118c which slides along a bottom surface of the bottom plate 6. Further, the modified plate 118 includes two holes 118d for receiving support rods 20, and a hole 118e for receiving adjustment rod 22. The hole 118e is screw threaded to match threads 24, or 24', when such an adjustment mechanism is used to move the plates. The modified plate 118 also includes portions 118a which project through the rod openings 8 and above the top of bottom plate 6 when the modified plate 118 is installed in the main body 2 of the auto-aligning ribbon splitter. The portions 118a abut an optical fiber ribbon, which is placed on bottom plate 6 within the tool, for centering the ribbon. Portion 118b of the modified plate 118 extends into a rod opening 8, but does not project above the top surface of the bottom plate 6. Thus, the modified plate only contacts the ribbon at extreme opposite ends of the tool, whereas the splitting edges 16, 34 contact the ribbon between the points where plates 118 contact it. This arrangement reduces the possibility that the protrusion 32 will accidentally move the plates 118 during use of the tool. The modified plate 118 may be either a movable plate, or a fixed plate, as described above.

It is contemplated that numerous modifications may be made to the auto-aligning ribbon splitter of the present invention without departing from the spirit and scope of the invention as defined in the following claims.

I claim:

1. An auto-aligning ribbon splitter comprising:
   a bottom plate having a channel therein, said channel including a first splitting edge;
   two movable plates disposed on said bottom plate and adjacent to said channel, wherein said movable plates are on opposite sides of, and are equidistantly spaced from, said first splitting edge;
   an adjustment mechanism connected to said movable plates so as to move said movable plates toward and away from one another.

2. The auto-aligning ribbon splitter according to claim 1, wherein said adjustment mechanism is connected to said movable plates so that said adjustment mechanism varies the distance between said first splitting edge and each of said movable plates while maintaining said movable plates equidistant from said first splitting edge.

3. The auto-aligning ribbon splitter according to claim 2, wherein said adjustment mechanism is a rod which is threaded with right-handed threads over a portion associated with one movable plate, and said rod is threaded with left-handed threads over a portion associated with the other movable plate.

4. The auto-aligning ribbon splitter according to claim 1, further comprising a top body having a second splitting edge which is capable of alignment with said first splitting edge.

5. The auto-aligning ribbon splitter according to claim 4, further comprising a main body attached to said bottom plate, wherein said top body is attached to said main body.

6. The auto-aligning ribbon splitter according to claim 5, wherein said top body is attached to said main body by a flexible tether.

7. The auto-aligning ribbon splitter according to claim 5, wherein said top body is attached to said main body by a connection which allows said top body and said main body to be separated enough to allow a midspan of an optical fiber ribbon to be inserted therebetween.

8. The auto-aligning ribbon splitter according to claim 1, wherein said bottom plate includes a top surface and a bottom surface, wherein said channel and said first splitting edge are formed in said top surface, and wherein said two movable plates are disposed on said bottom surface.

9. An auto-aligning ribbon splitter comprising:
   a bottom plate having a channel therein, said channel including a first splitting edge;
   at least one movable plate disposed on said bottom plate and parallel to said first splitting edge,
   an adjustment mechanism connected to said at least one movable plate so as to move said at least one movable plate toward and away from said first splitting edge.

10. The auto-aligning ribbon splitter according to claim 9, further comprising a fixed plate disposed on said bottom plate and parallel to said first splitting edge, wherein said fixed plate is set a fixed distance from said first splitting edge.

11. The auto-aligning ribbon splitter according to claim 9, wherein said at least one movable plate includes two movable plates on opposite sides of, and spaced equidistantly from, said first splitting edge.

12. The auto-aligning ribbon splitter according to claim 11, wherein said adjustment mechanism is connected to said two movable plates so that said adjustment mechanism varies the distance between said first splitting edge and each of said movable plates while maintaining said movable plates equidistant from said first splitting edge.

13. The auto-aligning ribbon splitter according to claim 9, wherein said bottom plate includes a top surface and a bottom surface, wherein said channel and said first splitting edge are formed in said top surface, and wherein said at least one movable plate is disposed on said bottom surface.

* * * * *